United States Patent [19]
Goodwin, III

[11] Patent Number: 6,012,040
[45] Date of Patent: Jan. 4, 2000

[54] EPL PRICE CHANGE VERIFICATION SYSTEM AND METHOD

[75] Inventor: John C. Goodwin, III, Suwanee, Ga.

[73] Assignee: NCR Corporation, Dayton, Ohio

[21] Appl. No.: 08/879,736

[22] Filed: Jun. 20, 1997

[51] Int. Cl.[7] .................................................. G06F 17/60
[52] U.S. Cl. ............................................... 705/20; 705/21
[58] Field of Search .................................. 705/20, 16, 21;
735/377, 378, 385; 364/478.01, 478.02,
478.03, 478.07, 478.13

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,072,381 | 12/1991 | Richardson et al. | 364/410 |
| 5,172,314 | 12/1992 | Poland et al. | 364/401 |
| 5,198,644 | 3/1993 | Pfeiffer et al. | 235/383 |
| 5,260,936 | 11/1993 | Bardet et al. | 370/61 |
| 5,448,226 | 9/1995 | Failing, Jr. et al. | 340/825.35 |
| 5,461,561 | 10/1995 | Ackerman et al. | 364/401 |
| 5,493,107 | 2/1996 | Gupta et al. | 235/383 |
| 5,526,267 | 6/1996 | Sogawa | 364/431.11 |
| 5,537,126 | 7/1996 | Kayser et al. | 345/1 |
| 5,539,393 | 7/1996 | Barfod | 340/825.52 |
| 5,572,653 | 11/1996 | DeTemple et al. | 395/501 |
| 5,684,990 | 11/1997 | Boothby | 707/203 |
| 5,870,714 | 2/1999 | Shetty et al. | 705/20 |

*Primary Examiner*—Emanuel Todd Voeltz
*Assistant Examiner*—Alexander Kalinowski
*Attorney, Agent, or Firm*—Paul W. Martin; Peter H. Priest

[57] ABSTRACT

A price change verification system and method for an electronic price label (EPL) system which verifies that price changes have been implemented by associated EPLs. A storage medium contains a record associated with the EPL. The record includes a price change time and a new price for the EPL. An EPL computer sends a price change message containing the new price to the EPL at a time substantially equal to the price change time. The EPL computer additionally verifies that the EPL is displaying the new price by reading the record to determine the price change time, obtaining a currently displayed price from the EPL, and comparing the currently displayed price to the new price.

12 Claims, 6 Drawing Sheets

EPL PRICE CHANGE VERIFICATION SYSTEM AND METHOD

BACKGROUND OF THE INVENTION

The present invention relates to electronic price label (EPL) systems, and more specifically to an electronic price label (EPL) price change verification system and method.

In a traditional retail store, bar code scanners rely on price information maintained within a price-lookup (PLU) file. The PLU data file is typically stored in a single location at a host server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information and EPL merchandise item information.

The central server sends price changes to EPLs. Scheduling and transmission of price change messages must occur without error in order to ensure that correct prices are displayed by EPLs associated with scheduled items.

Therefore, it would be desirable to provide an EPL price change verification system and method that can verify that an EPL is displaying a correct price following transmission of a scheduled price change message to the EPL.

SUMMARY OF THE INVENTION

In accordance with the teachings of the present invention, an electronic price label (EPL) price change verification system and method are provided.

The system includes a storage medium which contains a record associated with the EPL. The record includes a price change time and a new price for the EPL. An EPL computer sends a price change message containing the new price to the EPL at a time substantially equal to the price change time. The EPL computer additionally verifies that the EPL is displaying the new price by reading the record to determine the price change time, obtaining a currently displayed price from the EPL, and comparing the currently displayed price to the new price.

A method of verifying that a first price displayed by an electronic price label (EPL) has been replaced by a second price includes the steps of reading a record associated with the EPL to determine a price change time, obtaining a currently displayed price from the EPL by the EPL computer after the price change time, comparing the currently displayed price to the second price by the EPL computer, and sending a price change message to the EPL by the EPL computer to command the EPL to display the second price if the currently displayed price is not equal to the second price.

It is accordingly an object of the present invention to provide an electronic price label (EPL) price change verification system and method.

It is another object of the present invention to provide a system and method which ensures that an EPL is displaying a correct price following transmission of a scheduled price change message to the EPL.

It is another object of the present invention to provide a system and method which tracks a schedule of price change messages and which transmits a price check message following transmission of scheduled price change messages.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
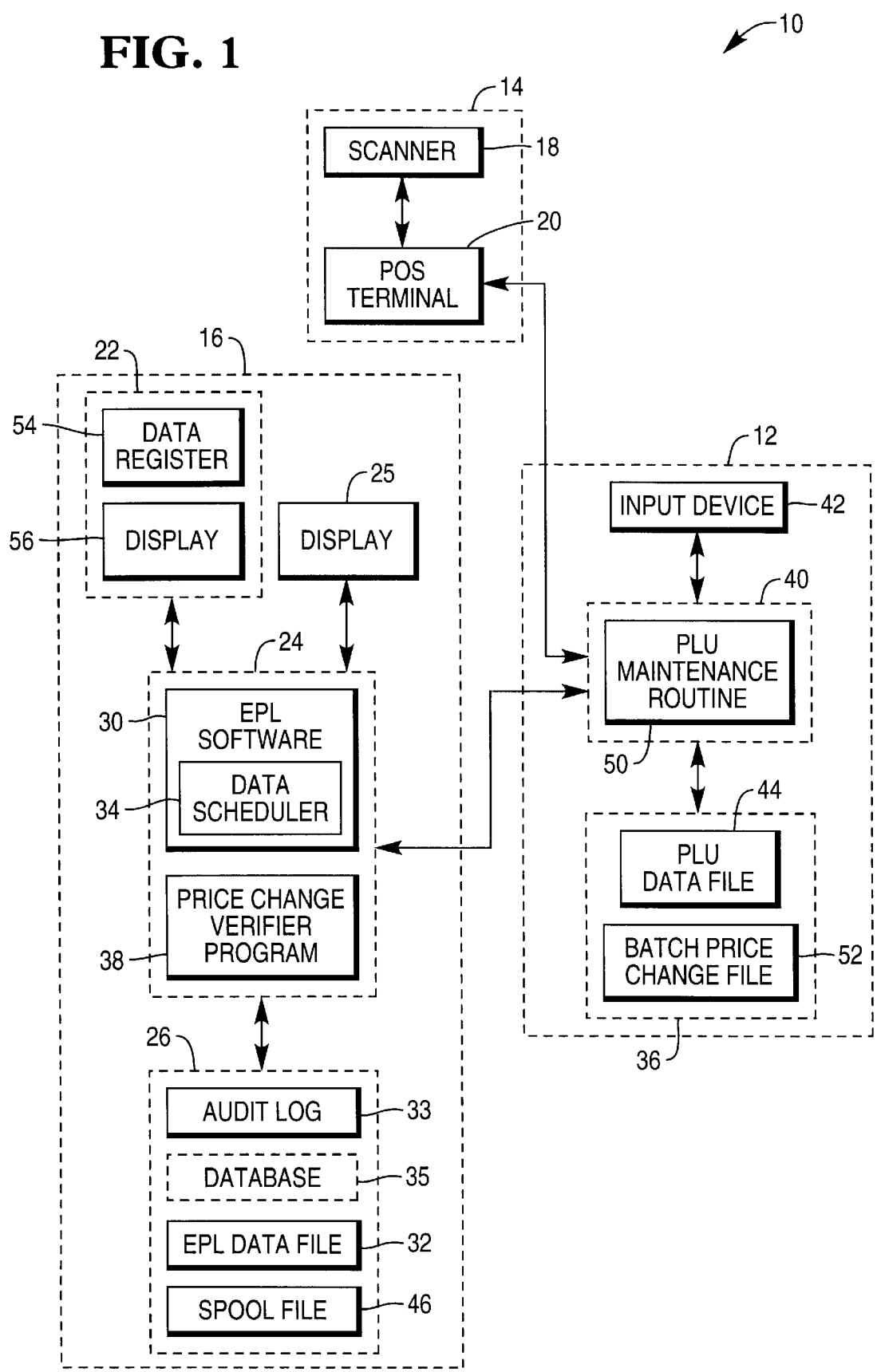
FIG. 1 is a block diagram of a transaction management system.

Referring now to FIG. 1, store system 10 primarily includes host computer system 12, point-of-service (POS) system 14, and EPL system 16.

POS system 14 includes bar code scanner 18 and terminal 20.

EPL system 16 primarily includes EPLs 22, host EPL terminal 24, display 25, and EPL storage medium 26.

EPLs 22 are typically attached to shelves within a store and include a data register 54 and a display 56. Data registers 54 contain data, usually the price of an item associated with an EPL on the shelves. The data is typically displayed by display 56.

Host EPL terminal 24 executes EPL software 30, which maintains the contents of EPL data file 32. Host EPL terminal 24 also executes price change verifier software 38, which is responsible for verifying that EPLs 22 have responded to scheduled price change messages by updating their displayed information.

EPL software 30 records, schedules, and transmits all messages to EPLs 22. EPL software 30 also maintains and uses EPL data file 32, which contains item information, such as a PLU number, and EPL identification information for each of EPLs 22.

In a first embodiment, EPL data file 32 also includes scheduled price change times for each EPL. In a second embodiment, scheduled price changes are maintained in a separate file, database 35. Of course, scheduled price change times could be maintained in either or both EPL data file 32 and database 35.

For this purpose, host EPL terminal 24 includes a real time clock or other time measuring device typical of a computer.

EPL software 30 includes data scheduler 34 which schedules EPL price change messages to EPLs 22. Data scheduler 34 produces spool file 46 which contains records of price changes scheduled by data scheduler 34.

Display 25 displays the contents of stored files, including EPL data file 32 and audit log 33, and displays an indication to an operator that an error has been logged, prompting the operator to take action in response to the error.

EPL storage medium 26 stores EPL data file 32, database 35, and spool file 46 and is preferably a fixed disk drive.

Host computer system 12 includes PLU storage medium 36, host PLU terminal 40, and input device 42.

PLU storage medium 36 stores PLU data file 44. PLU data file 44 is preferably the sole location for storing item prices and is available for distribution to POS terminal 20 by host PLU terminal 40. Alternatively, provision may be made for bar code scanner 18 to directly access primary PLU data file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals. Host computer system 12 may also be a remote computer system at a location where many stores are managed. In such a case, host computer system 12 maintains prices in PLU data file 44 and sends prices to EPL computer 24.

Host PLU terminal 40 executes PLU maintenance routine 50. PLU maintenance routine 50 updates PLU data file 44.

Input device 42 is preferably a keyboard.

PLU maintenance routine 50 may send changes in price in PLU data file 44 directly to EPL terminal 24 and POS terminal 20 as they are entered in input device 42 (immediate processing) or store price changes within a batch file 52 in EPL storage medium 36 for later batch updating (batch processing).

Figure 2:
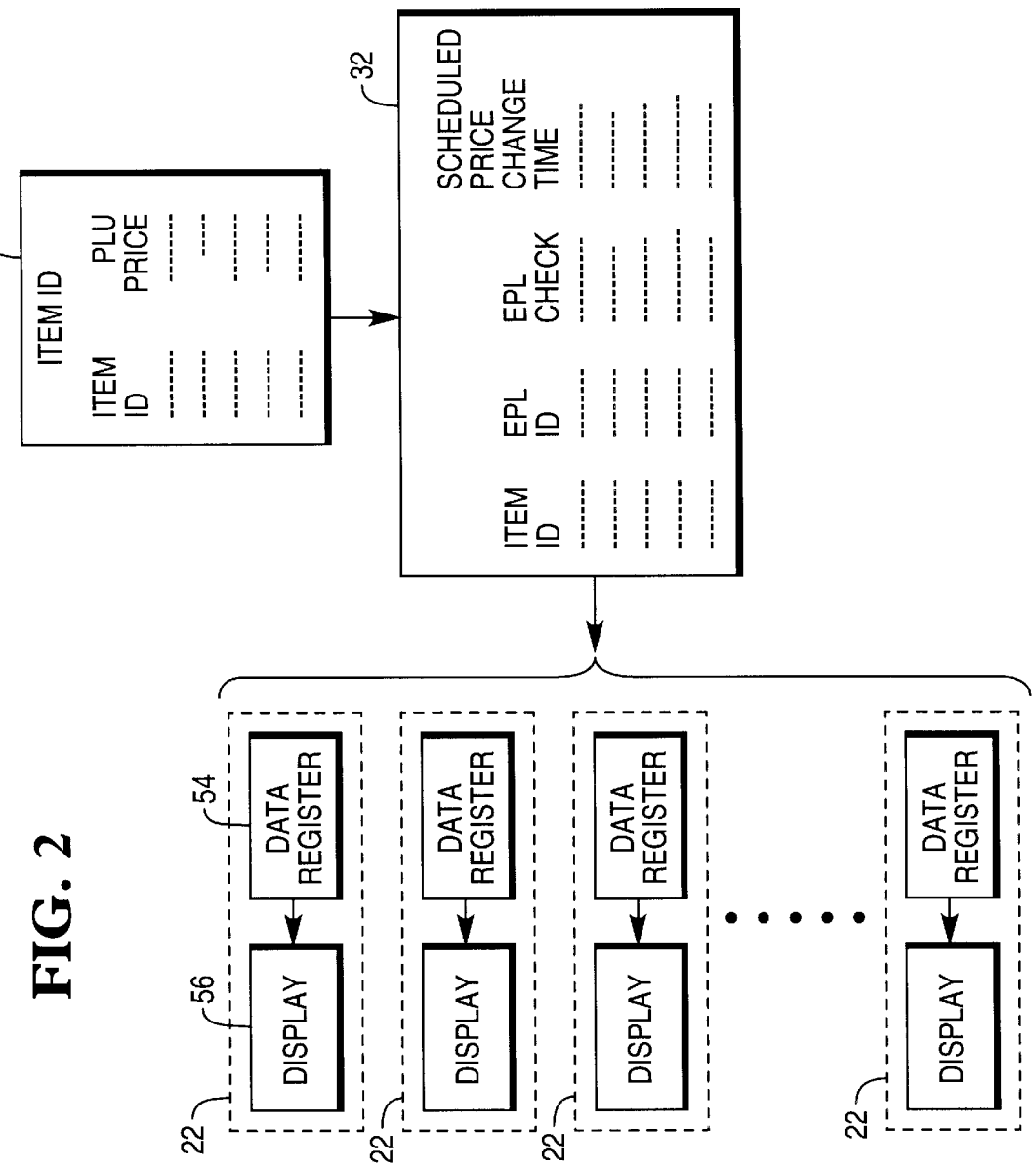
FIG. 2 is a diagram of the information within the PLU data file and the EPL data file in a first embodiment of the present invention.

Turning now to FIG. 2, EPL data file 32 and PLU data file 44 are shown in more detail. EPL data file 32 includes a line entry for each EPL 22 in EPL system 16. Each line entry has an item identification entry (ITEM ID), an EPL identification entry (EPL ID), and entry price checksum (EPL CHECK). Entry ITEM ID identifies a store item. Entry EPL ID identifies which EPL is assigned to the item. Entry price checksum (EPL CHECK) is calculated from the price in PLU data file 44.

In a first embodiment, EPL data file 32 also includes entry SCHEDULED PRICE CHANGE TIME for each EPL. In a second embodiment, scheduled price changes are maintained instead in a separate file, database 35. Of course, entry SCHEDULED PRICE CHANGE TIME could be maintained in either or both EPL data file 22 and database 32.

PLU data file 44 includes a line entry for each item sold in the store. Each line entry has an item identification entry (ITEM ID) identifying a store item, and a PLU price entry (PLU PRICE) identifying the price read by POS system 14 to determine the price of each item during scanning by bar code scanner 18.

During normal operation, EPL software 30 obtains price information for an item from PLU data file 44. EPL software 30 creates a checksum of the price information and compares the checksum to entry EPL CHECK for the EPL associated with the item. If the checksums are different, EPL software 30 creates a price change message to change the price displayed by the EPL. Data scheduler 34 schedules the price change message for transmission and writes an entry in spool file 46. EPL software 30 controls transmission of price change messages to the EPL. The EPL stores the price data in register 54. Finally, display 56 displays the price in data register 54.

Figure 3A:
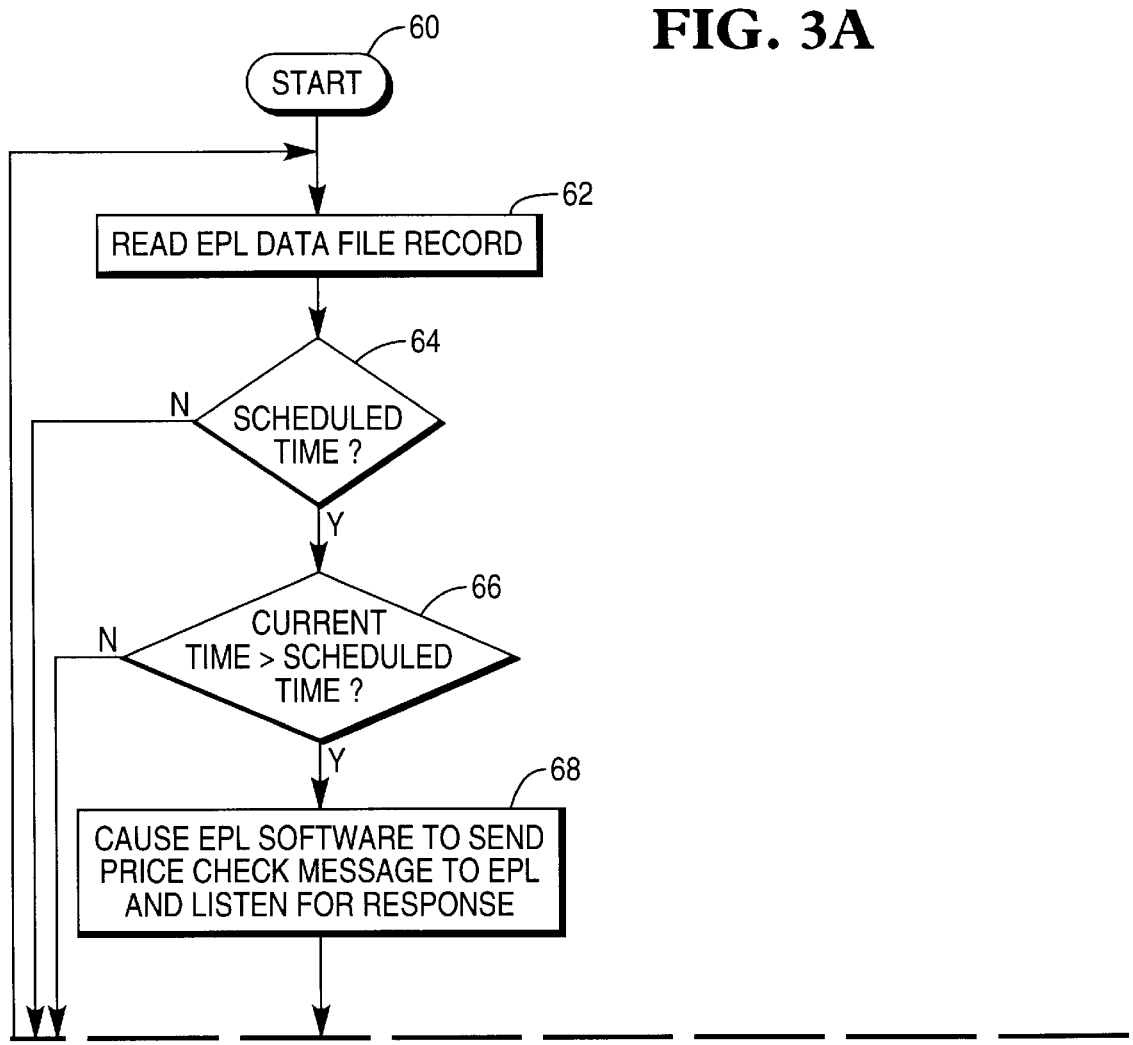
FIGS. 3A and 3B form a flow diagram illustrating a first embodiment of the method of the present invention.
Figure 3B:
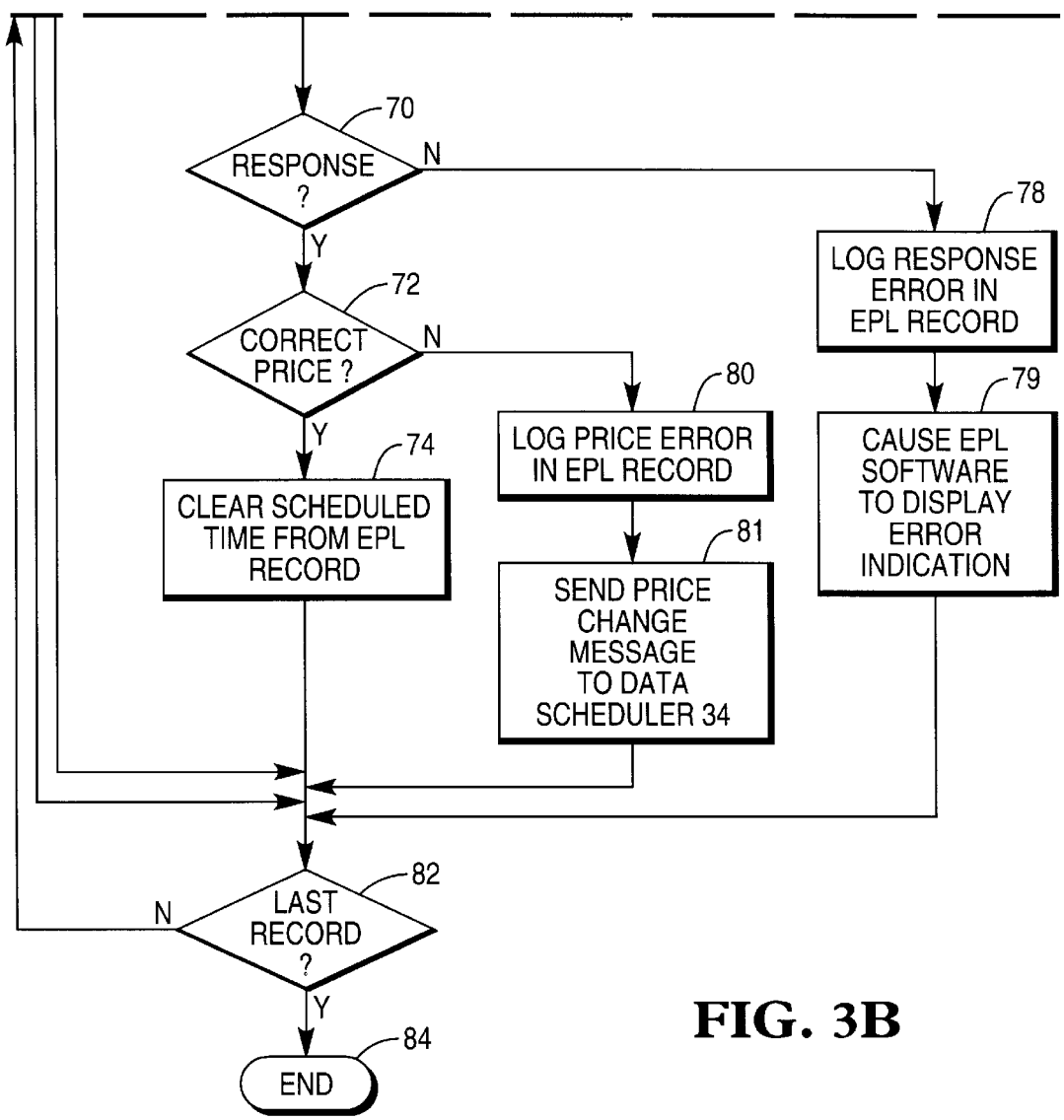

Turning now to FIGS. 3A and 3B, the operation of a first embodiment of price change verifier program 38 is shown in more detail beginning with START 60. The first embodiment examines EPL data file 32 for records that contain a scheduled price change time and then checks that each of the EPLs associated with those records is displaying the correct price.

In step 62, price change verifier software 38 reads an EPL record in EPL data file 32.

In step 64, price change verifier software 38 determines whether the EPL record contains a time entry SCHEDULED PRICE CHANGE TIME. If not, then operation proceeds to step 82. If so, then operation proceeds to step 66.

In step 66, price change verifier software 38 determines whether the current time is after the time in entry SCHEDULED PRICE CHANGE TIME. If not, then operation proceeds to step 82. If so, then operation proceeds to step 68.

In step 68, price change verifier software 38 causes EPL software 30 to send a price check message to the EPL and listen for a response.

In step 70, price change verifier software 38 determines whether a response from the EPL was received by EPL software 30. If not, then operation proceeds to step 78 and 79 in which price change verifier software 38 logs a response error in the EPL record and causes EPL software to display an error indication to an operator on display 25 before proceeding to step 82. The displayed error is reviewed by an operator, who must go to the location of the EPL to determine whether the EPL is stolen or broken, and, if so, replace the EPL. If a response from the EPL was received by EPL software 30, operation proceeds to step 72.

In step 72, price change verifier software 38 determines from EPL software 30 whether the EPL's response indicated that it was displaying the correct price. If not, operation proceeds to 80 and 81 in which price change verifier software 38 logs a price error in the EPL record and sends a price change message to data scheduler 34 before proceeding to step 82. If the EPL's response indicated that it was displaying the correct price, operation proceeds to step 74.

In step 74, price change verifier software 38 clears the scheduled time from the EPL record and operation returns to step 62. This ensures that the same EPL is not checked again the next time through EPL data file 32.

In step 82, price change verifier software 38 determines whether the current record is the last record. If not, operation returns to step 62. If so, operation ends in step 84.

Operation of price change verifier software 38 may be continuous or at the command of an operator.

Figure 4A:
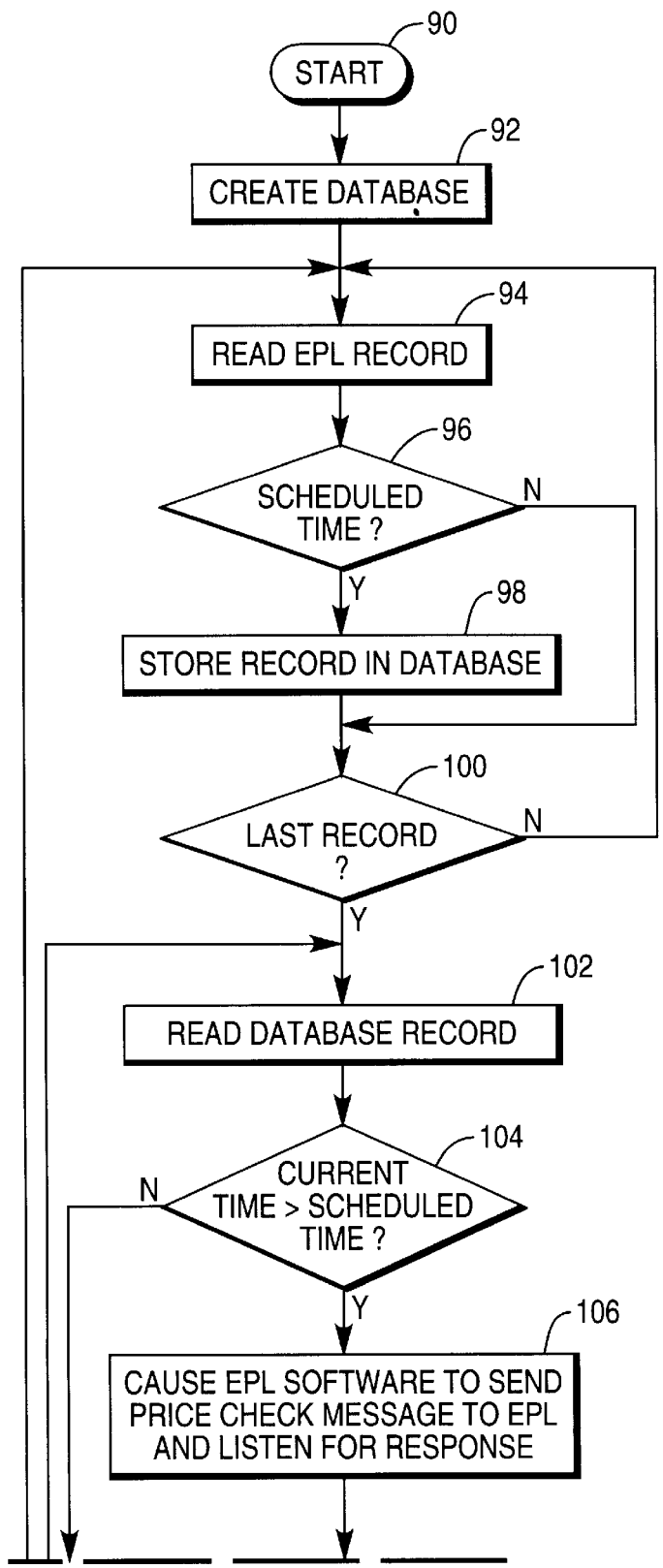
FIGS. 4A and 4B form a flow diagram illustrating a second embodiment of the method of the present invention.
Figure 4B:
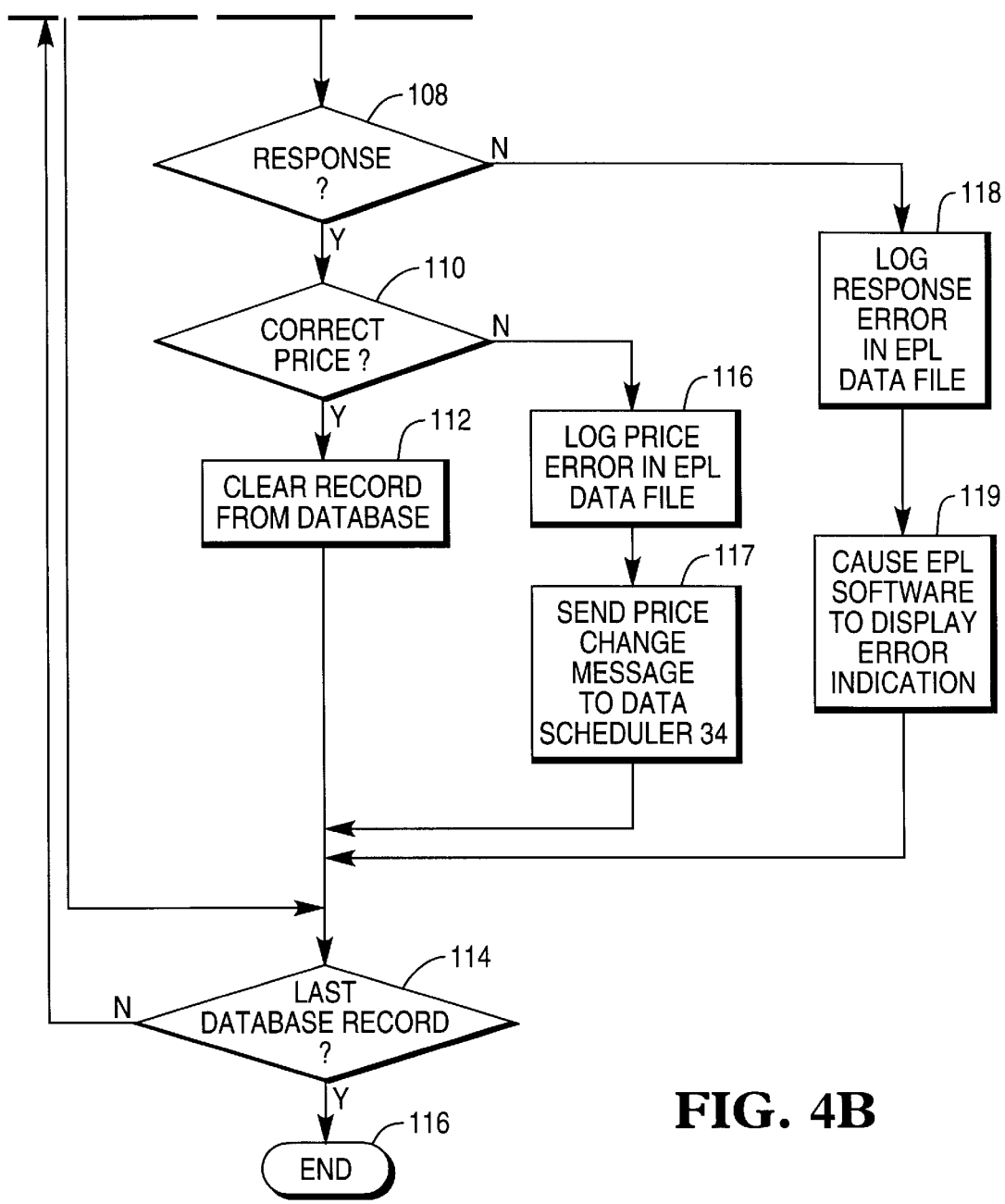

Turning now to FIGS. 4A and 4B, the operation of a second embodiment of price change verifier program 38 begins with START 90. The second embodiment creates a database 35 containing only records that contain a scheduled price change time and then checks that each of the EPLs associated with the records in database 35 is displaying the correct price.

In step 92, price change verifier program 38 creates database 35.

In step 94, price change verifier program 38 reads an EPL record in EPL data file 32.

In step 96, price change verifier software 38 determines whether the EPL record contains a time entry SCHEDULED PRICE CHANGE TIME. If not, then operation proceeds to step 100. If so, then operation proceeds to step 98.

In step 98, price change verifier software 38 stores the record in database 35.

In step 100, price change verifier software 38 determines whether the EPL record is the last record. If it is not, operation returns to step 94. If it is, operation continues with step 102.

In step 102, price change verifier software 38 reads a record in database 35.

In step 104, price change verifier software 38 determines whether the current time is after the time in entry SCHED- ULED PRICE CHANGE TIME. If not, then operation proceeds to step 114. If so, then operation proceeds to step 106.

In step 106, price change verifier software 38 causes EPL software 30 to send a price check message to the EPL and listen for a response.

In step 108, price change verifier software 38 determines whether a response from the EPL was received by EPL software 30. If not, then operation proceeds to steps 118 and 119 in which price change verifier software 38 logs a response error in the EPL record and sends a price change message to data scheduler 34 to correct the error before proceeding to step 114. If a response from the EPL was received by EPL software 30, operation proceeds to step 110.

In step 110, price change verifier software 38 determines from EPL software 30 whether the EPL's response indicated that it was displaying the correct price. If not, operation proceeds to 116 and 117 in which price change verifier software 38 logs a price error in the EPL record and causes EPL software 30 to display an error indication before proceeding to step 114. If the EPL's response indicated that it was displaying the correct price, operation proceeds to step 112.

In step 112, price change verifier software 38 clears the record from database 33 and operation proceeds to step 114.

In step 114, price change verifier software 38 determines whether the record is the last database record. If not, operation returns to step 102. If so, operation returns to step 94.

Operation of price change verifier software 38 may be continuous or at the command of an operator.

Although the present invention has been described with particular reference to certain preferred embodiments thereof, variations and modifications of the present invention can be effected within the spirit and scope of the following claims.

I claim:

1. A method of verifying that a first price displayed by an electronic price label (EPL) has been replaced by a second price comprising the steps of:

reading a record associated with the EPL to determine a price change time;

sending a price check message to the EPL after the price change time; and if a return message indicates the EPL is not displaying the second price, sending a price change message to the EPL to command the EPL to display the second price.

2. The method of claim 1 further comprising the step of:

if a return message is not received from the EPL, providing an error indication to an operator.

3. A method of verifying that a first price display by an electronic price label (EPL) has been replaced by a second price comprising the steps of:

storing a price change time in a record associated with the EPL by an EPL computer;

sending a price check message to the EPL after the price change time;

if a return message is not received from the EPL, providing an error indication to an operator; and if a return message is received from the EPL indicating the EPL is not displaying the second price, sending a price change message to the EPL to command the EPL to display the second price.

4. A price verification system for an electronic price label (EPL) system comprising:

a storage medium containing a record associated with an EPL, wherein the record includes a price change time and a new price for the EPL; and an EPL computer which sends a price change message containing the new price to the EPL at a time substantially equal to the price change time;

wherein the EPL computer additionally verifies that the EPL is displaying the new price by:

reading the record to determine the price change time;

sending a price check message to the EPL after the price change time; and verifying that a return message from the EPL indicates the new price is currently being displayed.

5. An electronic price label (EPL) system comprising:

a plurality of EPLs;

a storage medium containing a record associated with the EPLs, wherein the record includes price change times and new prices for a number of EPLs; and an EPL computer which sends price change messages containing the new prices to the number of EPLs at times substantially equal to the price change times;

wherein the EPL computer additionally verifies that the number of EPLs are displaying the new prices by:

reading the record to determine the price change times;

sending a number of price check messages to the number of EPLs after the price change times; and sending a price change message to each EPL which indicates in a return message that it is not displaying the new price.

6. The system of claim 5 wherein the EPL computer provides an error message to an operator if the return message is not received from each EPL.

7. The system of claim 5 wherein the EPL computer logs a response error in the record if the return message is not received from each EPL.

8. The system of claim 5 wherein each of the plurality of EPLs contains a data register and a display.

9. The system of claim 5 wherein each of the plurality of EPLs is located on a store shelf in a location adjacent to a corresponding plurality of items.

10. The system of claim 9 further comprising a price-lookup (PLU) file which contains a plurality of prices corresponding to the plurality of items.

11. The system of claim 10 further comprising a bar code scanner adapted to access the PLU file.

12. The system of claim 11 further comprising a point of sale terminal communicatively connected to the bar code scanner.

* * * * *